(12) United States Patent
Mizumura (10) Patent No.: US 9,068,601 B2
(45) Date of Patent: Jun. 30, 2015

(54) LINEAR GUIDE APPARATUS

(75) Inventor: Yoshinori Mizumura, Kanagawa (JP)

(73) Assignee: NSK Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 14/375,642

(22) PCT Filed: Aug. 10, 2012

(86) PCT No.: PCT/JP2012/005108
§ 371 (c)(1),
(2), (4) Date: Jul. 30, 2014

(87) PCT Pub. No.: WO2013/114475
PCT Pub. Date: Aug. 8, 2013

(65) Prior Publication Data
US 2015/0023618 A1 Jan. 22, 2015

(30) Foreign Application Priority Data

Jan. 31, 2012 (JP) .................. 2012-018404

(51) Int. Cl.
*F16C 29/06* (2006.01)
*F16C 33/10* (2006.01)
*F16C 33/66* (2006.01)

(52) U.S. Cl.
CPC ......... *F16C 33/6659* (2013.01); *F16C 29/0609* (2013.01); *F16C 29/0659* (2013.01); *F16C 29/06* (2013.01); *F16C 29/0602* (2013.01)

(58) Field of Classification Search
CPC ............. F16C 29/0607; F16C 29/0609; F16C 29/0633; F16C 29/0635; F16C 29/0638; F16C 29/064; F16C 29/0642; F16C 29/0647; F16C 29/065; F16C 29/0652; F16C 29/0657; F16C 29/0659; F16C 29/0661; F16C 29/0664; F16C 29/0666; F16C 33/6629; F16C 33/6681

USPC ................................ 384/13, 43, 45
See application file for complete search history.

(56) References Cited

U.S. PATENT DOCUMENTS

| 6,132,093 A | 10/2000 | Michioka et al. |
| 6,170,986 B1 | 1/2001 | Hsu et al. |
| 7,677,804 B2 * | 3/2010 | Geka et al. .................. 384/45 |

FOREIGN PATENT DOCUMENTS

| DE | 10 2006 062 105 A1 | 7/2008 |
| JP | 11-72119 A | 3/1999 |

(Continued)

OTHER PUBLICATIONS

Corresponding International Search Report dated Nov. 20, 2012 with English Translation (four (4) pages).

(Continued)

*Primary Examiner* — Phillip A Johnson
(74) *Attorney, Agent, or Firm* — Crowell & Moring LLP (57) ABSTRACT

A trunk portion (13) of each end face of a slider body of a linear guide apparatus is covered with trunk parts (212A, 212B) of retainers (2A, 2B) in the whole width direction. End faces of both of the trunk parts (212A, 212B) are provided with a projection portion (212c) and a recess portion (212d), respectively. The end faces of both of the trunk parts (212A, 212B) are brought into contact with each other in a width direction of the projection portion (212c) and the recess portion (212d), that is a thickness direction of the trunk portion (13) of the slider body, and has a gap in a length direction (i.e., width direction of the slider). End faces of adjacent trunk parts (212A, 212B) oppose each other at a position not overlapping an oil supply opening (70). Oil grooves (23) conforming to oil grooves (76) formed on the end cap (7) are provided on end cap side faces of plate-shaped portions (21A, 21B) integrally formed with the retainers (2A, 2B).

2 Claims, 8 Drawing Sheets (56) References Cited

FOREIGN PATENT DOCUMENTS

| JP | 3571911 B2 | 9/2004 |
|---|---|---|
| JP | 2005-207469 A | 8/2005 |
| JP | 2008-2660 A | 1/2008 |
| JP | 2008-138748 A | 6/2008 |
| JP | 2013-87936 A | 5/2013 |
| TW | 1290984 B | 12/2007 |

OTHER PUBLICATIONS

Japanese-language Written Opinion dated Nov. 20, 2012 (PCT/ISA/237) (three (3) pages).
International Preliminary Report on Patentability (PCT/IB/338 & PCT/IB/373), including English translation of Written Opinion (PCT/ISA/237) dated Aug. 14, 2014 (Six (6) pages).
Japanese Office Action dated Jul. 29, 2014, with English translation (Four (4) pages).

* cited by examiner

LINEAR GUIDE APPARATUS

TECHNICAL FIELD

The present invention relates to a linear guide apparatus.

BACKGROUND ART

The linear guide apparatus is provided with a guide rail, a slider, and plural rolling elements. The guide rail and the slider include rolling grooves (or rolling faces when the rolling elements are "rollers"), respectively, disposed opposing each other and forming a rolling passage of the rolling elements. The slider further includes a return passage of the rolling elements and a direction changing path for communicating the return passage with the rolling passage. Then, a circulation path of the rolling elements is configured with the rolling passage, the return passage, and the direction changing path. By circulation of the rolling elements through the circulation path, one of the guide rail and the slider is relatively and linearly moved to the other thereof.

In addition, the linear guide apparatus is provided with separators, each of the separator including a spacer disposed between adjacent rolling elements and an arm portion (i.e., guide portion) secured to the spacer and extending in an arrangement direction of the rolling elements, and a guide groove to guide the arm portion is formed in the circulation path of the rolling elements, in some cases. In such cases, the rolling elements move through the circulation path with being held or accommodated in the separators, and the arm portions of the separators moves along the guide groove.

PLT 1 discloses that the slider is configured with a body (i.e., block body), a resin circulation path forming body, and an end cap (i.e., side cover). The body is configured with leg portions respectively arranged on both sides in a width direction of the guide rail, and a trunk portion to connect both of the leg portions, and the rolling grooves are respectively formed on the inner sides of the leg portions.

As the resin circulation path forming body, PLT 1 discloses that a member (i.e., resin frame) is provided for each of the leg portions, the member being integrally formed of a retaining portion for retaining the rolling elements on the rolling face (i.e., load ball passage configuring portion extending along both side rims of the rolling groove), an inner circumference guiding portion (i.e., return guide) of the direction changing path, and a plate-shaped portion to be brought into contact with both end faces of each of the leg portions. Additionally, the end cap is secured to the end face of the body via the plate-shaped portion.

Further, in the end cap, an accommodating recess portion for accommodating the plate-shaped portion is formed in a uniform depth. PLT 1, however, does not disclose the plate-shaped portion being provided with an oil supply path forming groove for forming an oil path between the plate-shaped portion and the end cap.

PLT 2 discloses a retainer being provided for each of the leg portions of the slider body, the retainer being integrated with the plate-shaped portion to be brought into contact with both end faces of the body (except for a central portion in the width direction of the trunk portion), and a retaining portion disposed on the inner face of each of the leg portions and retaining the rolling elements on the rolling face, and the oil supply path forming groove is provided on an end cap side face of the plate-shaped portion. In addition, an oil supply opening penetrating through the end cap in a thickness direction at the central portion of the trunk portion of the end cap, and the oil supply path forming groove extending to both sides of the oil supply opening is formed on an abutting face abutting with the slider body.

Furthermore, on a body side face of the end cap, a face lower than the abutting face is formed as a disposition face of the plate-shaped portion of the retaining portion. Accordingly, by securing the end cap to the body on which the retainer is attached, the plate-shaped portion of the retainer is disposed on a plate-shaped portion disposition face of the end cap, so that the oil supply path forming groove of the end cap and the oil supply path forming groove of the plate-shaped portion are communicated with each other to form an oil supply path from an oil supply opening to the direction changing path.

In the configuration of PLT 2, however, when an interval between the plate-shaped portion disposition face of the end cap and the abutting face is smaller than the thickness of the plate-shaped portion of the retainer, a gap is generated at a location where the plate-shaped portion is not present between the end cap and the trunk portion of the body. Hence, the lubricant easily leaks.

CITATION LIST

Patent Literature

PLT 1: FIG. 40 to FIG. 44 of JP Patent No. 3,571,911
PLT 2: JP 2008-138748 A

SUMMARY OF INVENTION

Technical Problem

It is an object of the present invention to provide a linear guide apparatus in which a plate-shaped portion having an oil supply groove and being in contact with an end face of the slider body is integrally formed with a retainer, and the plate-shaped portion is disposed between the end face of the slider body and an end cap. In the linear guide apparatus, regardless of a relationship of an interval between a plate-shaped portion disposition face and an abutting face of the end cap (i.e., a face abutting with the slider body) and the thickness of the plate-shaped portion of the retainer, a lubricant is made to hardly leak from between the end cap and the slider body.

Solution to Problem

In order to address the above object, there is provided a linear guide apparatus, comprising the following configurations (a) to (e):

(a) a guide rail; a slider; and a plurality of rolling elements, wherein the guide rail and the slider are configured to form rolling faces disposed to oppose each other for forming a rolling passage of the plurality of rolling elements, the slider includes a return passage of the plurality of rolling elements, and a direction changing path for communicating the return passage and the rolling passage, a circulation path of the plurality of rolling elements is configured with the rolling passage, the return passage, and the direction changing path, the guide rail or the slider are configured to relatively move linearly with respect to each other, by the plurality of rolling elements circulating in the circulation path.

(b) the slider comprises: (1) a body including a pair of leg portions arranged on both sides in a width direction of the guide rail and a trunk portion connecting the pair of leg portions, the rolling faces being respectively formed on inner sides of the pair of leg portions, (2) a pair of retainers made of a synthetic resin and respectively arranged for the pair of leg portions, the pair of retainers being integrally formed with plate-shaped portions to be in contact with both of end faces of the body and a holding portion arranged on an inner face of each of the pair of leg portions and holding the plurality of rolling elements on the rolling faces, (3) an end cap including an oil supply opening to be connected with a lubricant supplying pipe, a recess portion forming an outer circumference of the direction changing path on a body side face of the end cap, and a deposition face of the plate-shaped portion lower than an abutting face to be in contact with the body, the end cap being secured to either of both of the end faces of the body, and (4) a return guide of forming an inner circumference of the direction changing path.

(c) an oil groove configured to form an oil path from the oil supply opening to the recess portion between the plate-shaped portion and the end cap, the oil groove being arranged on an end cap side face of the plate-shaped portion.

(d) the plate-shaped portion includes a leg part to be in contact with one of the pair of leg portions and a trunk part to be in contact with a part of the trunk portion.

(e) end faces of the trunk parts of the pair of retainers oppose each other or contact with each other at a central portion in a width direction of the trunk portion of each of the end faces of the body.

According to the linear guide apparatus in one aspect of the present invention, a pair of retainers satisfying the above configuration (2) are provided and the plate-shaped portion satisfies the above configurations (c) to (e), so that the lubricant existing in the oil path can be hardly leaked regardless of the relationship of the interval between the plate-shaped portion deposition face and the abutting face (i.e., the face to be brought into contact with the slider body) of the end cap and the thickness of the plate-shaped portion of the retainer. That is, even if the interval between the deposition face and the abutting face of the end cap is smaller than the thickness of the plate-shaped portion, the lubricant existing in the oil path can be hardly leaked.

In a case where the oil supply opening penetrates through the end cap in the thickness direction of the end cap and is connected with the oil groove of the plate-shaped portion, when the opposing or contacting position of the end faces of the adjacent trunk parts (i.e., the end faces of the trunk parts of both of the retainers) is set to the position of overlapping the oil supply opening, a measure should be taken for changing the size or the like of the oil supply opening so that the lubricant can be hardly leaked. However, the position is set not to overlap the oil supply opening, thereby eliminating such a measure.

Accordingly, in the case where the oil supply opening penetrates through the end cap in the thickness direction of the end cap and is connected with the oil groove of the plate-shaped portion of the retainer, it is desirable that the opposing or contacting position of the end faces of the adjacent trunk parts should be set to the position of not overlapping the oil supply opening.

In addition, in a case where the end faces of the adjacent trunk parts are both flat, even if the retainer is produced with the dimensional tolerance being strict for contact between both of the end faces, it may be difficult to obtain the retainer with a gap between both of the end faces being completely zero because of contraction or the like of a synthetic resin. In particular, in a case where the sizes of the adjacent trunk part (i.e., size in the width direction of the slider) both deviate to a larger one, it may be impossible not only to contact the end faces, but also to attach the retainer correctly.

In contrast, in a case where the end faces of the adjacent trunk parts have the recess portion and the projection portion to fit with each other, the lengths of the trunk parts are made smaller than the length in which the both ends contacts with each other and the widths of the recess portion and the projection portion of the trunk parts (i.e., size in the thickness direction of the trunk portion of the slider body) are made so that the recess portion and the projection portion of the trunk parts are brought into contact with each other or oppose each other with a slight gap. Hence, the lubricant can be hardly leaked from between both of the end faces. Since the widths of the trunk parts are smaller in size than the lengths of the trunk parts, the contraction quantity of the synthetic resin in the trunk part is smaller in the width direction than that in the length direction. Therefore, the size management becomes easy.

Accordingly, in the case where the end faces of the adjacent trunk parts have the recess portion and the projection portion to fit with each other, as compared to a case where the end faces are both flat, the lubricant can be hardly leaked from between both end faces more certainly.

Advantageous Effects of Invention

According to the linear guide apparatus of the present invention, a lubricant can be hardly leaked from between the end cap and the slider body, regardless of a relationship of an interval between a plate-shaped portion disposition face and an abutting face (i.e., a face abutting with the slider body) of the end cap and the thickness of the plate-shaped portion in the retainer.

DESCRIPTION OF EMBODIMENTS

Hereinafter, embodiments of the present invention will be described, but the present invention is not limited to the embodiments.

Figure 1:
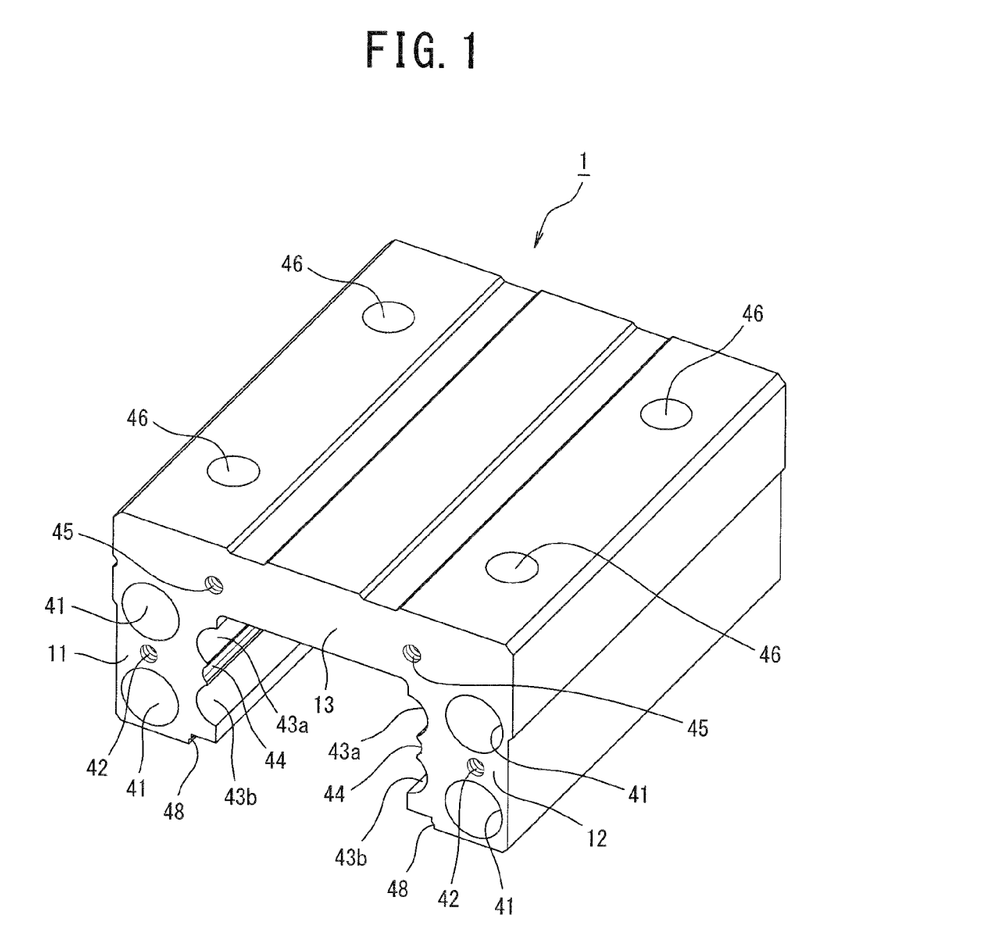
FIG. 1 is a perspective view illustrative of a body included in a slider according to an embodiment of the present invention.
Figure 2:
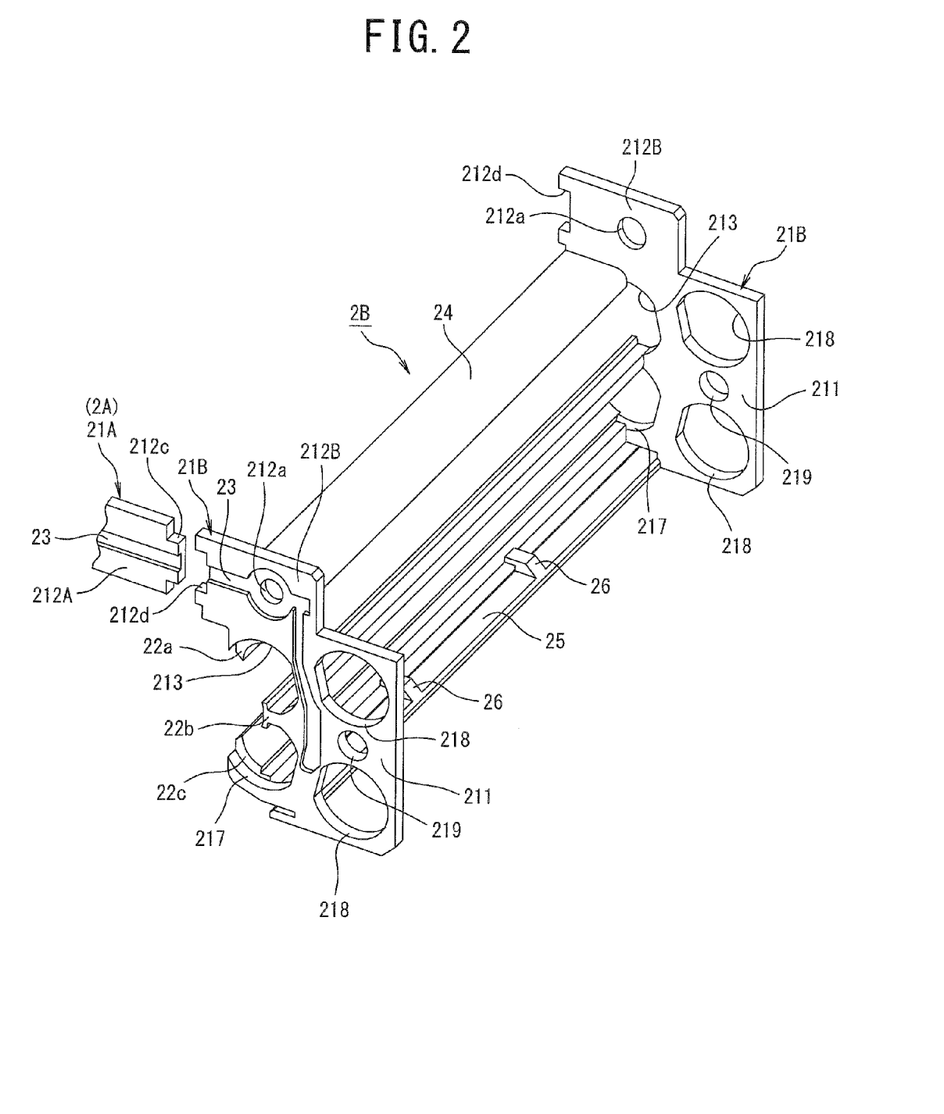
FIG. 2 is a perspective view illustrative of a retainer according to an embodiment of the present invention.
Figure 3:
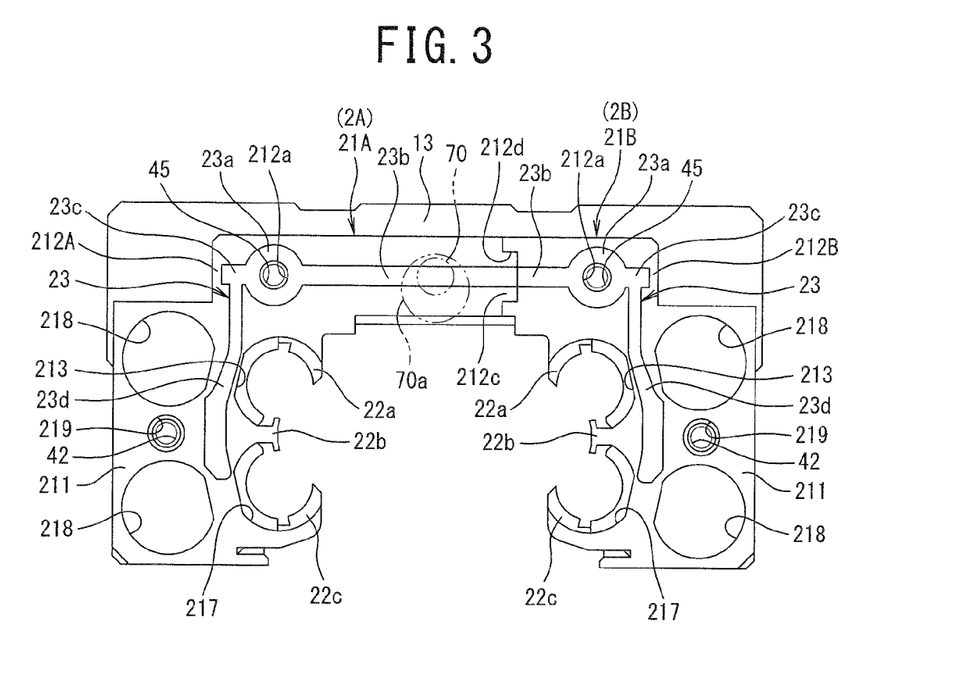
FIG. 3 is a front view illustrative of a state in which a pair of retainers are attached to the body of the slider.
Figure 4:
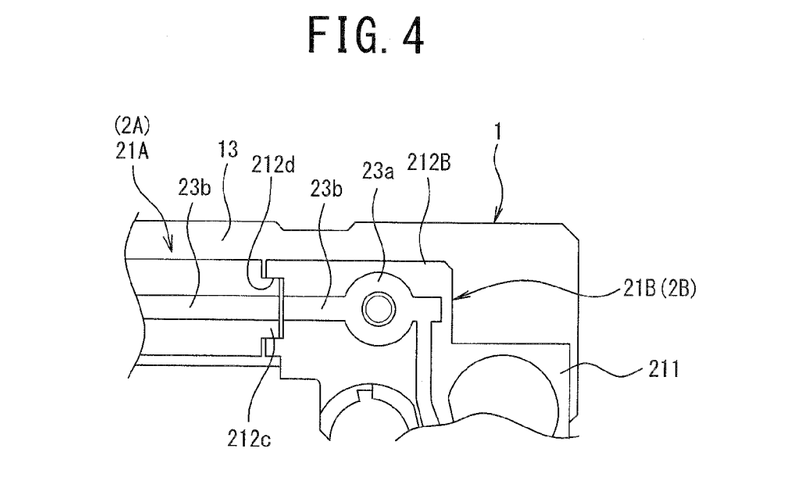
FIG. 4 is a partially enlarged view of FIG. 3.
Figure 5:
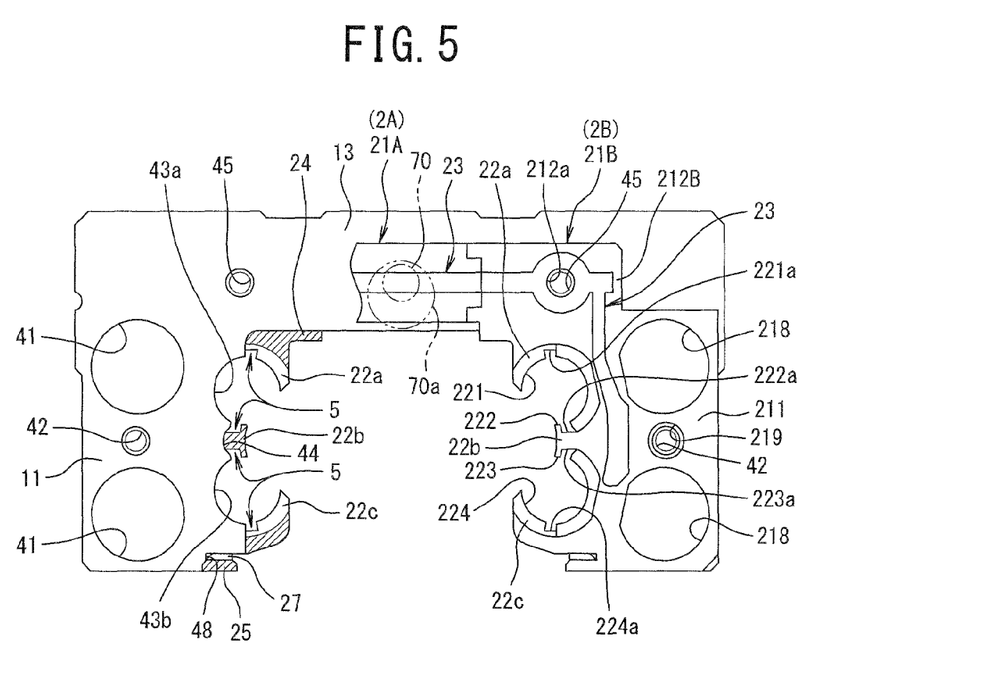
FIG. 5 is a partial sectional view of FIG. 3, illustrating with one of the retainers being cut away.

FIG. 1 is a perspective view illustrative of a body of a slider included in the linear guide apparatus according to the present embodiment. FIG. 2 is a perspective view illustrative of one of a pair of retainers included in the linear guide apparatus according to the present embodiment. FIG. 3 is a front view illustrative of a state in which a pair of retainers are attached to the body illustrated in FIG. 1, and FIG. 4 is a partially enlarged view of FIG. 3. FIG. 5 is a partial sectional view of FIG. 3, illustrating with one of the retainers being cut away.

Figure 6:
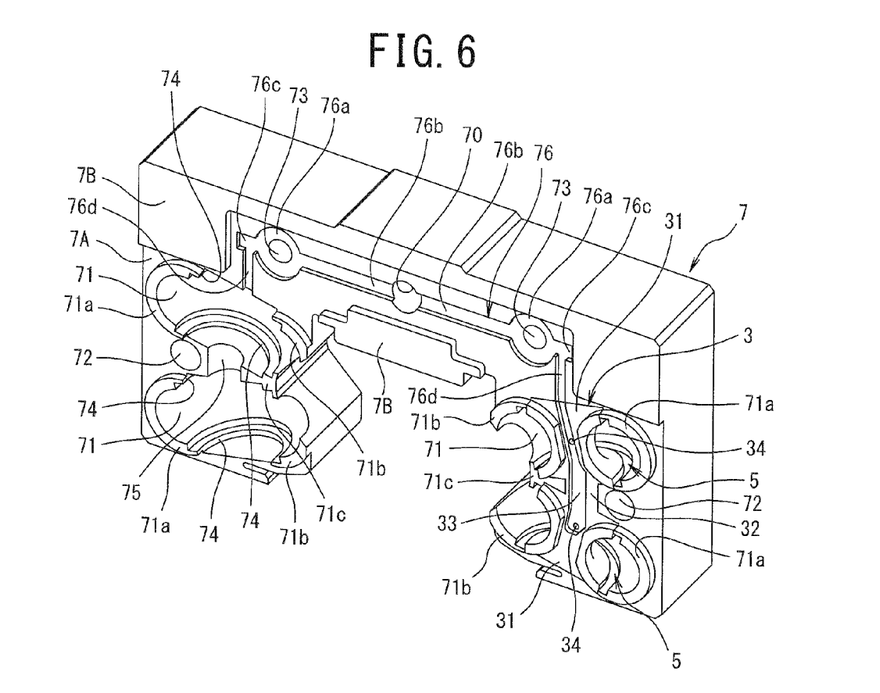
FIG. 6 is a perspective view illustrative of an end cap included in the slider according to an embodiment of the present invention.
Figure 7:
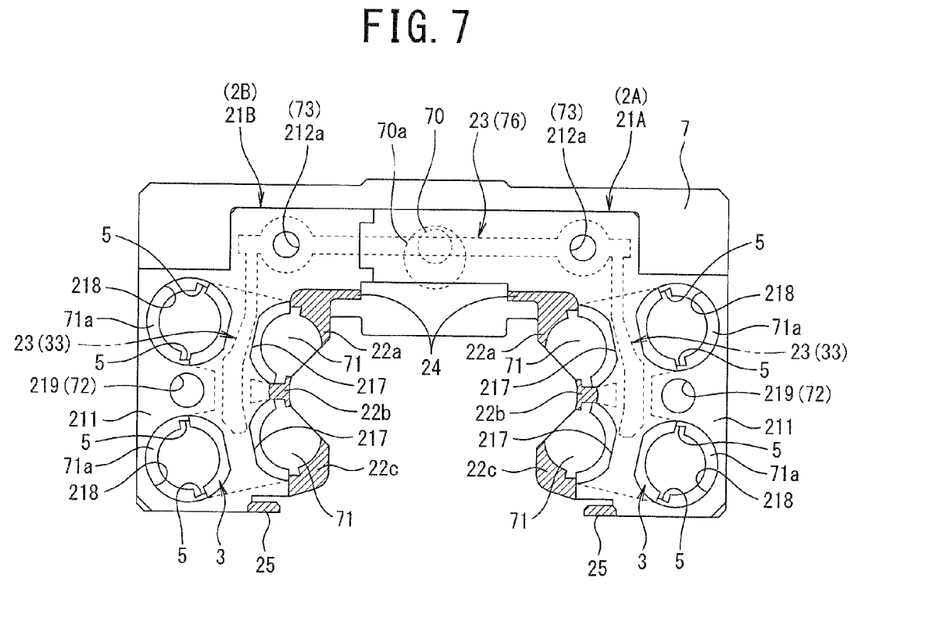
FIG. 7 is a view illustrative of an overlapping state of the end cap and a pair of retainers.

FIG. 6 is a perspective view illustrative of a body side face of an end cap of the slider included in the linear guide apparatus according to the present embodiment. FIG. 7 is a view illustrative of an overlapping state of the end cap of FIG. 6 and the retainer of FIG. 2.

As illustrated in these figures, the slider according to the present embodiment includes a body 1, a pair of retainers 2A and 2B, a return guide 3, and an end cap 7.

Referring to FIG. 1, the body 1 of the slider includes leg portions 11 and 12 disposed on both sides in the width direction of the guide rail, respectively, and a trunk portion 13 connecting both of the leg portions 11 and 12. Each of the leg portions 11 and 12 has two through holes 41 for two return passages, respectively, a screw hole 42 formed between the two through holes 41 so as to attach an end cap, and two rows of rolling grooves (rolling faces) 43a and 43b each having an arc-shaped cross section on an inner face. A groove 44 having an arc-shaped cross section is also formed between both of the rolling grooves 43a and 43b.

Screw holes 45 are formed on an end face of the trunk portion 13 of the body 1 so as to attach the end cap. Screw holes 46 are formed on a top face of the trunk portion 13 so as to attach the slider to another member. In addition, recess portions 48 are respectively arranged on the lower ends of both of the leg portions 11 and 12 of the body 1, so as to attach an underseal.

As illustrated in FIG. 3, retainers 2A and 2B are respectively provided for the leg portions 11 and 12 of the body 1. The retainers 2A and 2B, as illustrated in FIG. 2 and FIG. 3, include two plate-shaped portions 21A and two plate-shaped portions 21B, respectively. Each of the retainers 2A and 2B include an upper retaining portion 22a, a middle retaining portion 22b, a lower retaining portion 22c, a flange portion 24, a sleeve portion 25, and coupling portions 26, respectively. FIG. 2 partially illustrates the left-side retainer 2A and entirely illustrates the right-side retainer 2B, but the left-side retainer 2A is same as the right-side 2B except for the shape of a part of the plate-shaped portion 21A.

The plate-shaped portions 21A and 21B include leg portions 211 disposed to conform to the leg portions 11 and 12 of the body 1. The plate-shaped portions 21A and 21B include trunk parts 212A and 212B disposed to conform to the trunk portions 13, respectively. An upper recess portion 213 and a lower recess portion 217 are formed on the inner side in the width direction of each of the leg portions 211. Two through holes 218 communicating with the two through holes 41 of each of the leg portions 11 and 12 of the body 1 and a through hole 219 communicating with the screw hole 42 of each of the leg portions 11 and 12 of the body 1 are formed on the outer side in the width direction of the leg portions 211. Through holes 212a communicating with the screw holes 45 of the trunk portion 13 of the body 1 are formed in the trunk parts 212A and 212B, respectively.

In addition, the trunk part 212A of the retainer 2A for the leg portion 11 (left side of FIG. 3) is longer than the trunk part 212B of the retainer 2B for the leg portion 12, and extends to the right side of the center (i.e., locations of an oil supply opening 70 and a joint attachment hole 70a of the end cap 7, as will be described later) in the width direction of the trunk portion 13 of the body 1. A projection portion 212c is formed on an end face of the trunk part 212A of the retainer 2A. A recess portion 212d to be fitted by the projection portion 212c is arranged on an end face of the trunk part 212B of the retainer 2B. FIG. 4 is an enlarged view illustrative of this part.

As illustrated in FIG. 4, the lengths of the trunk parts 212A and 212B (i.e., the sizes in the width direction of the slider) are made slightly shorter than the length in which both end faces come in contact with each other, and the width of the projection portion 212c of the trunk part 212A and the recess portion 212d of the trunk part 212B (i.e., the size in the thickness direction of the trunk portion 13 of the body 1) are made so that the projection portion 212c of the trunk part 212A and the recess portion 212d of the trunk part 212B are brought into contact with each other.

Further, an oil groove 23 made to conform to an oil groove 76, to be described later, formed in the end cap 7 is formed on an end cap side face of the plate-shaped portions 21A and 21B. The oil groove 23 includes circular grooves 23a on the outer side of the through hole 212a, straight grooves 23b extending inward along the trunk parts 212A and 212B from the circular grooves 23a, angular grooves 23c extending outward from the circular grooves 23a, and long grooves 23d extending to the leg portions from the angular grooves 23c. The long grooves 23d respectively extend between the through hole 218 and the upper recess portion 213, and also extend between the through hole 218 and the lower recess portion 217.

Regarding the retainers 2A and 2B, the two plate-shaped portions 21A and the two plate-shaped portions 21B are respectively spaced apart from each other by a distance corresponding to the distance between the end faces of the body 1. Between the two plate-shaped portions 21A and 21B, the flange portion 24, the upper retaining portion 22a, the middle retaining portion 22b, the lower retaining portion 22c, and the sleeve portion 25 are provided from the trunk portion 13 side, and integrated together. Moreover, the sleeve portion 25 and the lower retaining portion 22c are coupled by the coupling portion 26, such that the retainers 2A and 2B respectively have integrated shapes formed by injection molding of a synthetic resin.

FIG. 5 is a view illustrative of the plate-shaped portion 21A of the left-side retainer 2A in which the leg portion side is cut along a contact plane to be in contact with both end faces of the body 1.

As can be seen from FIG. 5, the upper retaining portions 22a, the middle retaining portions 22b, and the lower retaining portions 22c are arranged on the inner face of the body 1 and serve as members to cause the two rows of rolling grooves 43a and 43b to hold balls (i.e., the rolling elements) in each of the leg portions 11 and 12. The flange portion 24 is interposed between the trunk portion 13 and the guide rail and serves as a member to be arranged on the lower face of the trunk portion 13. The sleeve portion 25 is a member of forming a recess portion 27, for attaching the underseal, between the sleeve portion 25 and a recess portion 48 of the body 1.

According to the linear guide apparatus of the present embodiment, a separator having an arm portion is arranged between adjacent balls for circulating the balls, the slider is provided with guide slots 5 to guide the arm portions. In other words, as illustrated in FIG. 5, the guide slots 5 are configured with inner faces continuous with the rolling grooves 43a and 43b of the leg portions 11 and 12 of the body 1, and recess portions 221a to 224a, extending entirely in the length direction of the slider, provided in the retaining portions 22a to 22c of each of the retainers 2A and 2B.

The upper retaining portion 22a is arranged on top of the upper rolling groove 43a, and includes an arc-shaped ball retaining face 221 to conform to the diameters of the balls, and a recess portion 221a continuous with the ball retaining face 221 made to conform to the diameters of the balls. The flange portion 24 is integrated with the upper retaining portion 22a. The middle retaining portion 22b is arranged at a groove 44 between the upper and lower rolling grooves 43a and 43b, and includes recess portions 222a and 223a continuous with the upper and lower ball retaining faces 222 and 223, respectively. The lower retaining portion 22c is arranged at bottom of the lower rolling groove 43b, and includes an arc-shaped ball retaining face 224 made to conform to the diameters of the balls, and a recess portion 224a continuous with the ball retaining face 224.

As illustrated in FIG. 6, the oil supply opening 70 penetrating in the thickness direction of the end cap 7 is formed at the center of the trunk portion of the end cap 7. In addition, two recess portions 71 forming an outer circumferential guide face of the direction changing path are formed on a body side face of the end cap 7 in each of the leg portions, and through holes 72 for the attachment bolts to penetrate therethrough are arranged between the upper and lower recess portions 71, respectively.

In the end cap 7, through holes 73 are also formed at locations conforming to the screw holes 45 of the trunk portion 13 of the body 1, respectively. Furthermore, recess portions 74 to be fitted by edge portions 31 of the return guide 3 and a recess portion 75 to be fitted by a coupling portion 32 of the return guide 3 are formed in the end cap 7.

On the body side face of the end cap 7, a part (i.e., disposition face) 7A in which the plate-shaped portions 21A and 21B of the retainers 2A and 2B are deposited is lower than an abutting face (i.e., contact face to be brought into contact with an end face of the body 1) 7B by the thickness of the plate-shaped portion 21A or 21B.

Therefore, edge portions 71a and 71b protruding at a height equal to or higher than the abutting face 7B from the disposition face 7A are provided around the recess portions 71, respectively. End faces in the length direction of the upper retaining portion 22a and the lower retaining portion 22c of the retainers 2A and 2B are arranged on a protruding face (flush with the abutting face 7B) of the edge portion 71b. A face 71c on which the intermediate retaining portion 22b is arranged is as high as the disposition face 7A.

Furthermore, the disposition face 7A of the end cap 7 is provided with the oil groove 76 extending from the oil supply opening 70 to the recess portions 71 on both sides. The oil groove 76 is configured with circular grooves 76a on the outer side of the through holes 73, straight grooves 76b extending in a linear shape leftward and rightward (outward in the width direction) from the oil supply opening 70 to reach the circular grooves 76a, respectively, angular grooves 76c extending outward from the circular grooves 76a, and longitudinal grooves 76d extending toward the recess portions 71 from the angular grooves 76c.

In other words, the oil groove 76 is formed at the location where the trunk parts 212A and 212B of the plate-shaped portion 21 are to be arranged. In addition, grooves 33 continuous with the oil grooves 76d are formed in the return guide 3. Oil supply holes 34 penetrating through the return guide 3 are formed at locations respectively conforming to the recess portions 71 of the groove 33.

FIG. 7 is a view illustrative of the slider after the slider is assembled, in which the body 1 is omitted and the retainers 2A and 2B are cut just before the plate-shaped portions 21A and 21B, and the end cap 7 side is viewed. As illustrated in FIG. 7, a joint attachment hole 70a is arranged at a location of the oil supply opening 70 of the end cap 7. The joint attachment hole 70a extends to a partway in the thickness direction from a face opposing the disposition face 7A of the end cap 7, and communicates with the oil supply opening 70.

When the linear guide apparatus according to the present embodiment is assembled, the retainers 2A and 2B are firstly attached to the body 1 of the slider from the inner side of each of the leg portions 11 and 12, and the plate-shaped portions 21A and 21B are arranged on both end faces of the body 1.

Subsequently, the return guide 3 and the end cap 7 are deposited at one end face of the body 1. The screw holes 42 of the body 1, the through holes 219 of the plate-shaped portions 21A and 21B, and the through holes 72 of the end cap 7 are respectively aligned with each other, and the screw holes 45 of the body 1, the through holes 212a of the plate-shaped portions 21A and 21B, and the through hole 73 of the end cap 7 are respectively aligned with each other. Then, the end cap 7 is attached to the body 1 by bolts or small screws.

By such attachment, the plate-shaped portions 21A and 21B of the retainers 2A and 2B are disposed on the disposition face 7A of the end cap 7, as illustrated in FIG. 7. An oil path is configured with the oil groove 76 of the end cap 7, the oil groove 33 of the return guide 3, and the oil groove 23 of the plate-shaped portions 21A and 21B overlapping the oil groove 33. In addition, the upper and lower direction changing paths are configured with the upper and lower recess portions 71 in the return guide 3 and the end cap 7. Furthermore, the guide slots 5 are respectively formed in the direction changing path by the return guide 3 and the edge portions 71a of the recess portions 71.

Next, although not illustrated, a return passage is formed in the body 1 by inserting a sleeve or the like having the guide slot or guide face to guide the arm portion of the separator having the arm portion, into the through hole 41 of the body 1.

After that, from an end (the other end face side) to which the end cap 7 of the body 1 is not attached, balls and the separators having the arm portions are alternately entered in the direction changing path configured with the rolling passage, the return passage, and the end cap 7 and the return guide 3 attached to the body 1. Then, the balls and separators having the arm portions are alternately entered in the direction changing path configured with the other end cap 7 and the return guide 3, and the end cap 7, and then the return guide 3 are secured to the other end face of the body 1 in the similar manner as described above. In this manner, an oil path configured with the oil grooves 76 and 33 and the oil groove 23 is formed at the other end part of the slider.

Both leg portions of the slider are disposed on both sides in the width direction of the guide rail by sliding and moving the slider assembled in this manner from an end portion of the guide rail. Thus, the balls are arranged in the rolling passage configured with the rolling grooves 43a and 43b of the slider and the rolling groove of the guide rail.

In the linear guide apparatus according to the present embodiment, by connecting a grease nipple or the like (i.e., lubricant supplying pipe) with the joint attachment hole 70a, the lubricant introduced from the oil supply opening 70 passes through the oil path configured with the oil grooves 23 formed in the plate-shaped portions 21A and 21B of the retainers 2A and 2B, and the oil grooves 76 and 33 of the end cap 7 and return guide 3, so as to be supplied to the direction changing path from the oil supply hole 34 of the return guide 3.

Additionally, the trunk parts 212A and 212B of the retainers 2A and 2B cover a central portion in the width direction of the trunk portion 13 on each end face of the body 1, in the whole width direction. Furthermore, end faces of both trunk parts 212A and 212B are fitted to each other at the projection portion 212c and the recess portion 212d to be brought into contact with each other in the width direction of the projection portion 212c and the recess portion 212d (i.e., in the thickness direction of the trunk portion 13 of the body 1), and a slight gap is made in the length direction of the retainers 2A and 2B (i.e., in the width direction of the slider). In other words, the end faces of the trunk parts 212A and 212B of the retainers 2A and 2B oppose each other at a central portion in the width direction of the trunk portion 13 on each end face of the body 1. Moreover, the end faces of the adjacent trunk parts 212A and 212B oppose each other at a location of not overlapping the oil supply opening 70.

Accordingly, regardless of the relationship of the interval between the disposition face 7A and the abutting face 7B of the end cap 7 and the thickness of the plate-shaped portions 21A and 21B of the retainers 2A and 2B, the lubricant in the oil path can be hardly leaked. In other words, even in the case where the interval between the disposition face 7A and the abutting face 7B of the end cap 7 is smaller than the thickness of the plate-shaped portions 21A and 21B of the retainers 2A and 2B, the lubricant in the oil path can be hardly leaked.

(Another Example with Another Oil Path Pattern)

The oil grooves of the plate-shaped portions 21A and 21B of the retainers 2A and 2B are formed to overlap the oil grooves formed in the end cap 7 and the return guide 3. When the end cap 7 of FIG. 8 is used, for example, the retainers 2A and 2B illustrated in FIG. 9 are used.

Figure 8:
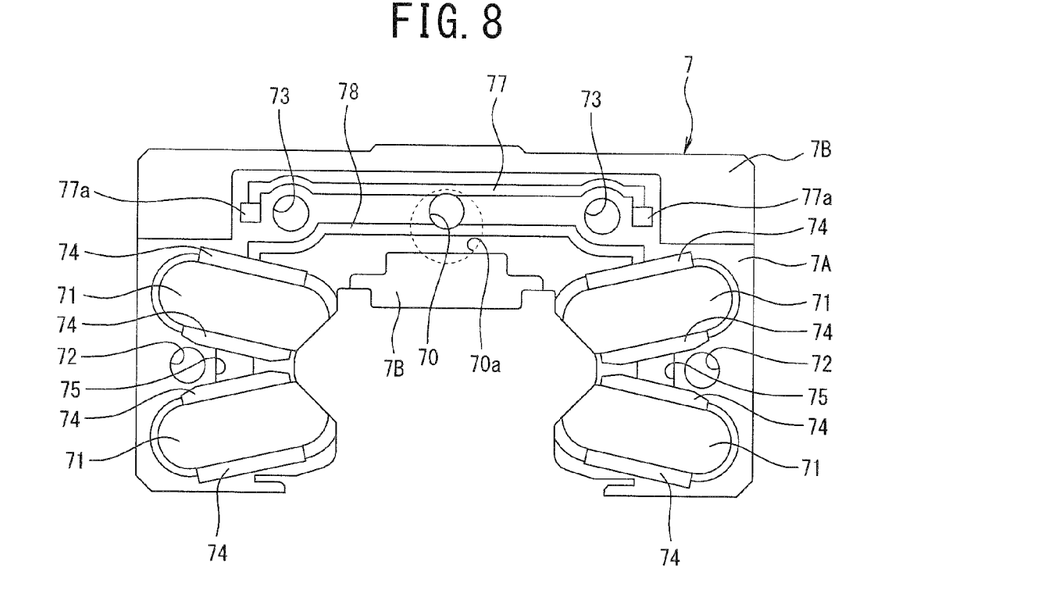
FIG. 8 is a front view illustrative of the end cap with another oil path pattern.

The recess portion 74 to be fitted by edge portions 31 of the return guide 3 and the recess portion 75 to be fitted by the coupling portion 32 of the return guide 3 are formed in the end cap 7 of FIG. 8, in a similar manner to FIG. 6. In addition, the oil grooves 77 and 78 are formed to vertically interpose the oil supply opening 70. The upper oil groove 77 linearly extends leftward and rightward above the oil supply opening 70, forms arc shapes on the upper side of the through hole 73, and then turns downward at right angle to reach oil reservoirs 77a, respectively.

The lower oil groove 78 linearly extends leftward and rightward below the oil supply opening 70, forms arc shapes on the lower side of the through hole 73, extends laterally a little, and then turns downward at right angle to reach the recess portions 71, respectively. Also in the end cap 7 of FIG. 8, the return guides 3 configured in a similar manner to FIG. 6 are fitted into the recess portions 74 and 75 for use, respectively, so that the groove 33 of the return guide 3 continues with the lower oil groove 78.

Figure 9:
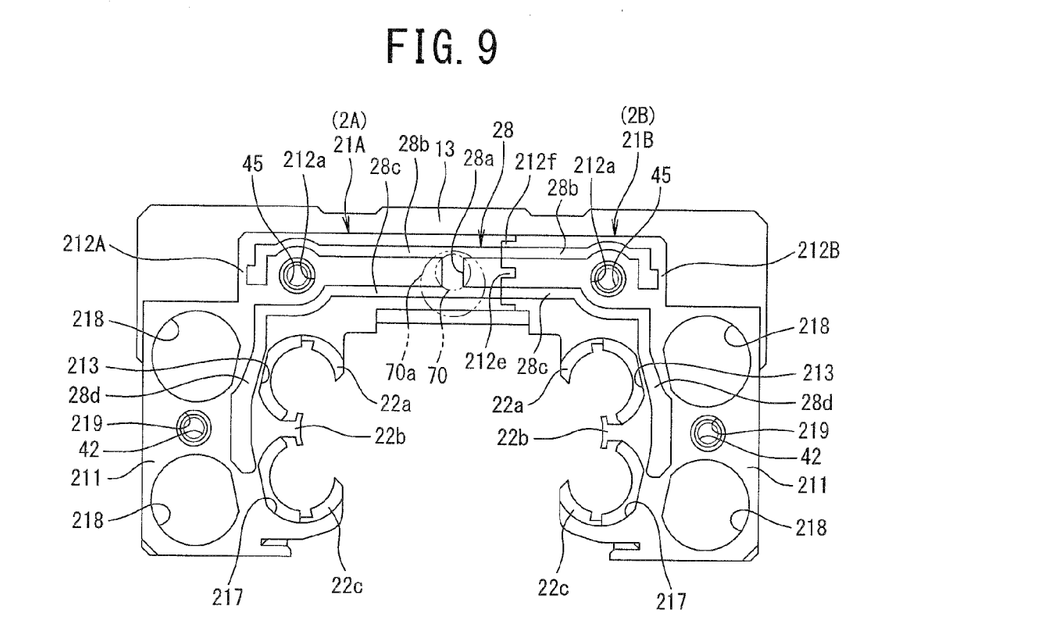
FIG. 9 is a front view illustrative of a state in which a retainer for the end cap of FIG. 8 is attached to the slider body.

As illustrated in FIG. 9, an oil groove 28 to overlap the oil grooves 77 and 78 of the end cap 7, the oil supply opening 70, and the groove 33 of the return guide 3 is formed in the plate-shaped portions 21A and 21B of the retainers 2A and 2B. The oil groove 28 includes a part 28a to overlap the oil supply opening 70, a part 28b to overlap the upper oil groove 77, a part 28c to overlap the lower oil groove 78, and a part 28d to overlap the groove 33 of the return guide 3. The parts 28b and 28c to respectively overlap the upper and lower oil grooves 77 and 78 are coupled with the part 28a to overlap the oil supply opening 70.

Figure 10:
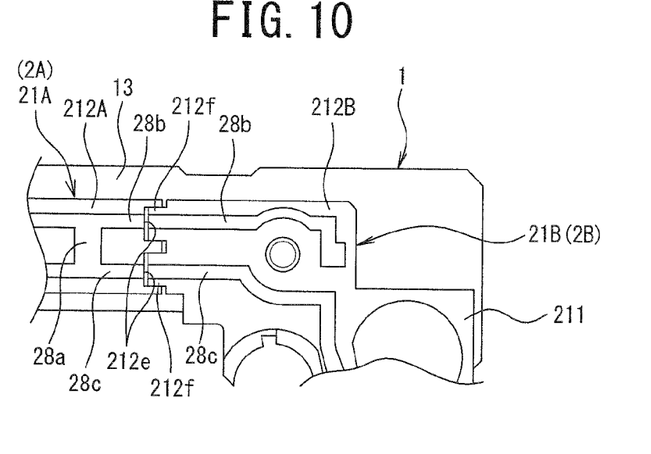
FIG. 10 is a partially enlarged view of FIG. 9.

In addition, the trunk part 212A of the retainer 2A for the leg portion 11 (illustrated on the left side in FIG. 9) is longer than the trunk part 212B of the retainer 2B for the leg portion 12, and extends to the right side of the center (i.e., the locations of the oil supply opening 70 and the joint attachment hole 70a of the end cap 7) in the width direction of the trunk portion 13 of the body 1. Recess portions 212e are formed at locations of the respective oil grooves 28b and 28c on the end face of the trunk part 212A of the retainer 2A. Projection portions 212f to be fitted into the respective recess portions 212e are formed on the end face of the trunk part 212B of the retainer 2B. FIG. 10 is an enlarged view illustrative of this part.

As illustrated in FIG. 10, the lengths of the trunk parts 212A and 212B (i.e., the size in the width direction of the slider) are slightly made shorter than a size with which both end faces are brought into contact, and the widths of the recess portions 212e of the trunk part 212A and the projection portions 212f of the trunk part 212B (i.e., the size in the thickness direction of the trunk portion 13 of the body 1) are made to have the sizes to contact with each other.

An Example in which a Projection is Provided on an End Face

As to the end faces of both trunk parts 212A and 212B of the retainers 2A and 2B, a projection is provided on one of the end faces to project from the one of the end face, whereas the other of the end faces of the trunk portion is made flat, so that the projection may be elastically deformed by contacting with the flat face at the time of attachment. As compared with the case where such a projection is not provided, even if the dimensional tolerance is not strict very much, the lubricant can be hardly leaked from between both end faces.

Figure 11:
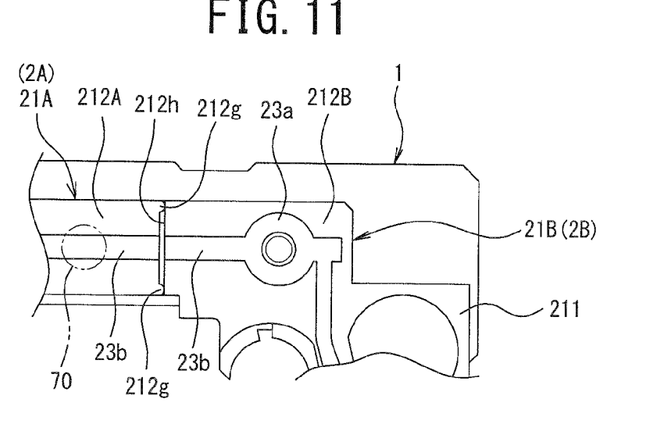
FIG. 11 is a view illustrative of an example of a relationship between end faces of adjacent trunk portions.
Figure 12:
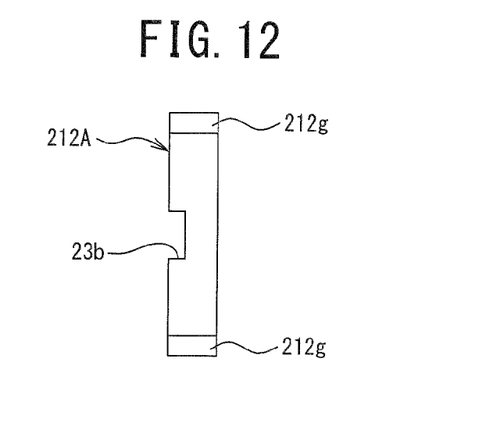
FIG. 12 is a view illustrative of an end face of a trunk part on the left side of FIG. 11.

FIG. 11 is a partially enlarged view of a front view illustrative of a state where the retainers 2A and 2B are attached to the body. FIG. 12 is a view illustrative of an end face of the trunk part 212A of the retainer 2A.

In this example, protrusions 212g protruding from the end faces of the trunk part 212A are provided at end faces of the trunk part 212A, whereas an end face 212h of the trunk part 212B is made flat. The protrusions 212g are formed on the end faces of the trunk part 212A at both ends in the width direction. The protrusions 212g become an elastically deformed state by contacting with the flat face 212h at the time of attachment.

Figure 13:
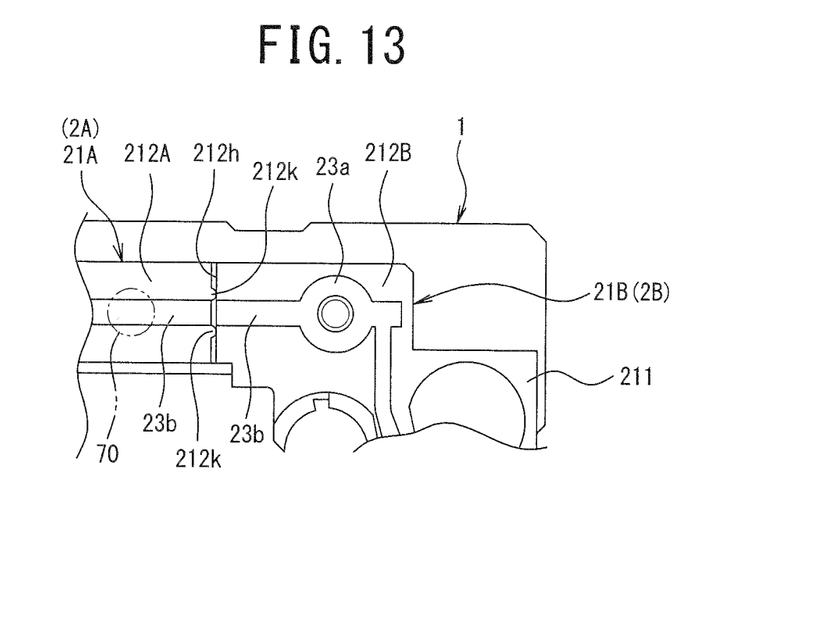
FIG. 13 is a view illustrative of an example of a relationship between end faces of adjacent trunk parts.
Figure 14:
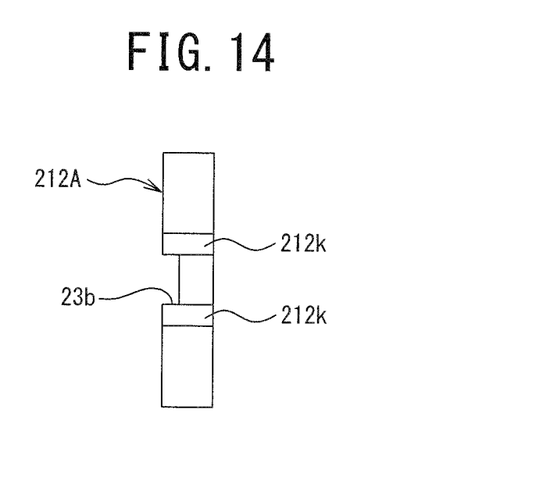
FIG. 14 is a view illustrative of an end face of the trunk part on the left side of FIG. 13.

FIG. 13 is a partially enlarged view of a front view illustrative of a state where the retainers 2A and 2B are attached to the body. FIG. 14 is a view illustrative of an end face of the trunk part 212A of the retainer 2A.

In this example, projections 212k projecting from the end faces of the trunk part 212A are provided at the trunk part 212A, whereas the end face 212h of the trunk part 212B is made flat. The projections 212k are formed on both end faces of an oil groove 23b of the trunk part 212A. The projections 212k become an elastically deformed state by contacting with the flat face 212h at the time of attachment.

It is to be noted that each of the above embodiments has been described is an example in which the end faces of adjacent trunk parts 212A and 212B oppose each other or contact with each other at a location of not overlapping the oil supply opening 70. However, even if the end faces of adjacent trunk parts 212A and 212B contact with each other at a location of overlapping the oil supply opening 70, the lubricant can be hardly leaked as compared to the configuration of the PLT 2. In addition, even if the end faces of adjacent trunk parts 212A and 212B are both flat faces, the lubricant can be hardly leaked as compared to the configuration of the PLT 2.

REFERENCE SIGNS LIST 1 body of slider
11, 12 leg portion of body
13 trunk portion of body
2A, 2B retainer
21A, 21B plate-shaped portion of retainer
211 leg part of plate-shaped portion 212A, 212B trunk part of plate-shaped portion
212c projection portion arranged on end face of trunk part
212d recess portion arranged on end face of trunk part
212e recess portion arranged on end face of trunk part
212f projection portion arranged on end face of trunk part
22a upper retaining portion of retainer
22b middle retaining portion of retainer
22c lower retaining portion of retainer
23 oil groove of plate-shaped portion
28 oil groove of plate-shaped portion
3 return guide
33 oil groove of return guide
43a, 43b rolling groove
7 end cap
7A part on which plate-shaped portion is disposed (disposition face)
7B abutting face (face to brought into contact with end face of body)
70 oil supply opening
71 recess portion forming outer circumference of direction changing path
76 oil groove of end cap
77 oil groove of end cap
78 oil groove of end cap

The invention claimed is:

1. A linear guide apparatus, comprising:
a guide rail;
a slider; and
a plurality of rolling elements, wherein:
the guide rail and the slider are configured to form rolling faces disposed to oppose each other for forming a rolling passage for the plurality of rolling elements,
the slider includes a return passage for the plurality of rolling elements, and a direction changing path for communicating the return passage and the rolling passage,
a circulation path of the plurality of rolling elements is configured with the rolling passage, the return passage, and the direction changing path,
the guide rail or the slider are configured to relatively move linearly with respect to each other, by the plurality of rolling elements circulating in the circulation path,
the slider comprises:
(1) a body including a pair of leg portions arranged on both sides in a width direction of the guide rail and a trunk portion connecting the pair of leg portions, the rolling faces being respectively formed on inner sides of the pair of leg portions,
(2) a pair of retainers made of a synthetic resin and respectively arranged on the pair of leg portions, the pair of retainers being integrally formed with plate-shaped portions to be in contact with both end faces of the body and a holding portion arranged on an inner face of each of the pair of leg portions and holding the plurality of rolling elements on the rolling faces,
(3) an end cap including an oil supply opening to be connected with a lubricant supplying pipe, a recess portion forming an outer circumference of the direction changing path on a body side face of the end cap, and a deposition face for the plate-shaped portion lower than an abutting face to be in contact with the body, the end cap being secured to either or both of the end faces of the body, and
(4) a return guide forming an inner circumference of the direction changing path,
an oil groove configured to form an oil path from the oil supply opening to the recess portion between the plate-shaped portion and the end cap, the oil groove being arranged on an end cap side face facing the plate-shaped portion,
the plate-shaped portion includes a leg part to be in contact with one of the pair of leg portions and a trunk part to be in contact with a part of the trunk portion, and
end faces of the trunk parts of the pair of retainers oppose each other or contact with each other at a central portion in a width direction of the trunk portion of each of the end faces of the body, wherein a recess portion and a projection portion fit the end faces of adjacent trunk parts with each other.

2. The linear guide apparatus according to claim 1, wherein:
the oil supply opening is configured to penetrate through the end cap in a thickness direction of the end cap and to be connected to an oil groove of the plate-shaped portion of the retainer, and
the end faces of adjacent trunk parts oppose each other or contact with each other at a position not overlapping the oil supply opening.

* * * * *